US007243777B2

(12) United States Patent
Reznik et al.

(10) Patent No.: US 7,243,777 B2
(45) Date of Patent: Jul. 17, 2007

(54) OMEGA PACKAGE SORTER

(75) Inventors: Dan Reznik, Plainsboro, NJ (US);
Christoph Holst, Schwarzenbek (DE);
Ricardo N. Schiesser, Ada, MI (US);
Frank W. Veit, Spring Lake, MI (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 11/293,960

(22) Filed: Dec. 5, 2005

(65) Prior Publication Data
US 2006/0151288 A1 Jul. 13, 2006

Related U.S. Application Data

(60) Provisional application No. 60/637,218, filed on Dec. 17, 2004.

(51) Int. Cl.
*B65G 47/10* (2006.01)
(52) U.S. Cl. .................... 198/370.02; 198/890
(58) Field of Classification Search ........ 198/890, 198/890.1, 370.02, 370.03
See application file for complete search history.

(56) References Cited

U.S. PATENT DOCUMENTS 3,987,888 A    10/1976  Wickam et al.
5,284,252 A    2/1994   Bonnet
5,613,591 A    3/1997   Heit et al.
6,230,872 B1   5/2001   Huang et al.
6,513,642 B1   2/2003   Shearer, Jr. et al.
6,702,106 B1 * 3/2004   Sweazy ................ 198/890
6,784,391 B2   8/2004   Takizawa
6,802,412 B2 * 10/2004  Lapeyre et al. ....... 198/370.02
6,951,274 B2 * 10/2005  Zeitler et al. ........ 198/890
2002/0096417 A1* 7/2002  Veit et al. ............ 198/370.02

FOREIGN PATENT DOCUMENTS

DE    44 42 586 A1    6/1996

OTHER PUBLICATIONS

Kruskal, Clyde P. "A Unified Theory of Interconnection Network Structure" *Courant Institute of Mathematical Sciences*.

* cited by examiner

*Primary Examiner*—James R Bidwell
(74) *Attorney, Agent, or Firm*—Michele L. Conover

(57) ABSTRACT

A method and apparatus for sorting or pre-sorting objects contains a system of conveyors and crossover diverters incorporating the topology of an omega network. The sorter interconnects a series of perfect shuffle networks, interleaved with banks of crossover switches. Collision avoidance is implemented by controlling flow on accumulator conveyors entering the crossover switches. Extra banks of crossover switches may be added to provide redundancy and load-balancing capabilities to the system.

21 Claims, 11 Drawing Sheets

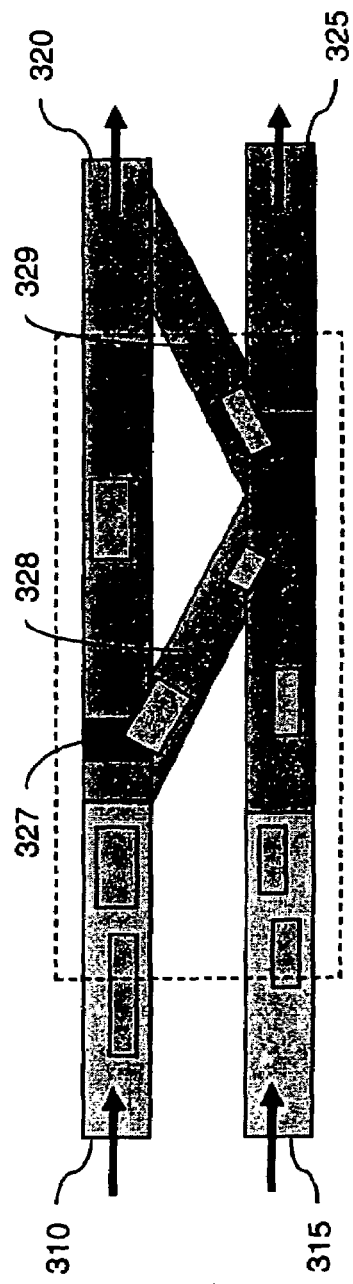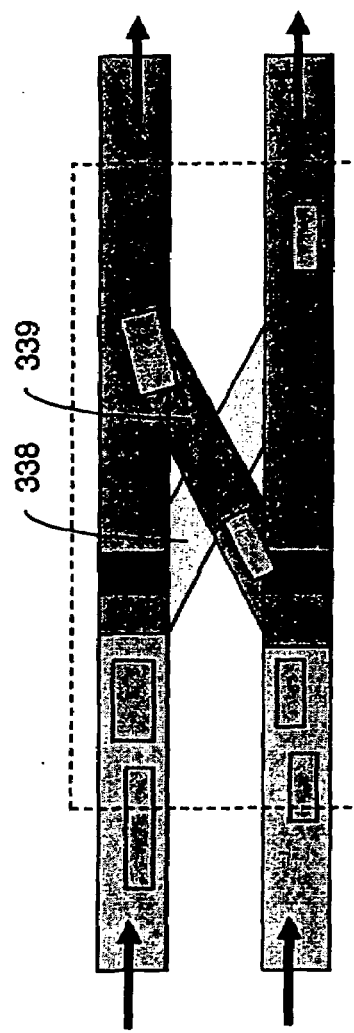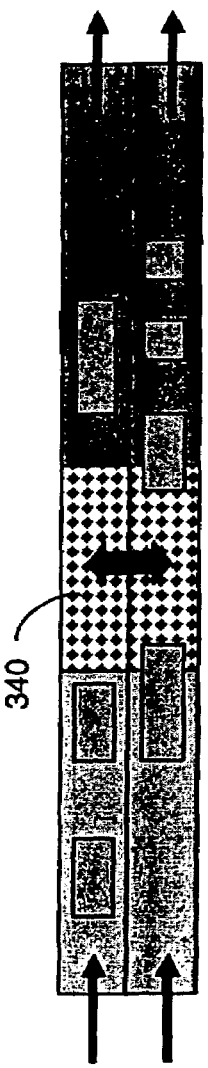
*Fig. 3a*  *Fig. 3b*  *Fig. 3c*

Pre-merge

OMEGA PACKAGE SORTER

CLAIM OF PRIORITY

This application claims priority to, and incorporates by reference herein in its entirety, pending U.S. Provisional Patent Application Ser. No. 60/637,218, filed Dec. 17, 2004, and entitled "The Omega Sorter: High Rates at Low Speeds."

FIELD OF THE INVENTION

The present invention relates generally to the field of package or object handling. More specifically, the invention relates to package sorters and presorters for routing packages received through one or more inputs, to be transmitted to one or more outputs.

BACKGROUND OF THE INVENTION

Sortation is a key added-value operation in distribution centers (DCs). Input product must be routed to its correct destination; e.g., as derived from its identification tag, such as an RFID or barcode. Sortation rate measured in cartons per minute (cpm) is a key performance measure for sorters. Other important criteria are low cost, small footprint, low noise, short (if any) downtimes, safety, reliability, fault-tolerance, and ability to handle skewed product mixes.

Two popular sortation concepts are linear sorters and circular or carousel sorters. A linear sorter is made up of one or more slat conveyors with laterally sliding shoes actuated at appropriate times to divert parcels onto fixed destination chutes. A carousel sorter is based on a circular train of bidirectional cross belts. Product is inducted by one or more induction systems; cross belts are run in one direction to accept product, and in the same or reverse direction to release it at the appropriate destination.

Linear sorters are inherently simpler in construction; however, higher rates require higher conveyance speeds and/or smaller inter-package gaps, imposing hard real-time constraints on the controller and mechanical system. Parallel utilization of linear sorters is often used when rates above the control or mechanical limits are needed. Product must be pre-sorted at the total rate to feed each linear sorter branch; the pre-sorter uptime is a crucial bottleneck for continuous operation.

Circular sorters are inherently parallel and can double as buffers; however, they require complex induct and release control (parcels must be pre-rotated, pre-gapped, etc.), and must be operated at relatively low speed to keep centrifugal forces low.

Sorters have also been proposed based on a matrix of multidirectional conveyors, a rotary accept-release unit with vertical motion, a crossbar array of shoe sorters, and others.

In a typical DC application, product is inducted into typically 30-60 induction conveyors and merged into a few (e.g., 2) "trunks," after which it is pre-sorted and inducted (gapped) into one or more sortation units. Failure of either component implies partial (or complete) system stoppage, causing costly downtimes. Additionally, the system can only poorly compensate for product imbalance, requiring unreasonably large buffers to accommodate surges in imbalanced flow.

There is therefore presently a need for a method and system for a fault-tolerant, high-rate sortation unit that reduces or eliminates the need for both merge and induct apparatus. To the inventors' knowledge, no such techniques are currently available.

SUMMARY OF THE INVENTION

The present invention addresses the needs described above by providing a method for sorting an object in a sorter having N input rows, the object entering the sorter in a current row. The method comprises the steps of (A) setting a first crossover switch to one of a straight position that does not change the current row of the object, and a cross position that switches the object to a row having a binary representation with a parity opposite that of a binary representation of the current row, (B) passing the object through the crossover switch to a new current row, (C) transferring the object from the current row to a new current row having a binary representation that is a circular rotation of a binary representation of the current row, (D) setting a next crossover switch to one of a straight position that does not change the current row of the object, and a cross position that switches the object to a row having a binary representation with a parity opposite that of a binary representation of the current row, (E) passing the object through the crossover switch to a new current row, and (F) repeating steps (C) through (E) a total of $\log_2(N)$-1 times.

Steps (A) through (F) may be performed on first and second objects, wherein steps (A) and (B) are initially performed on the second object before repeating steps (C) through (E) a total of $\log_2(N)$-1 times on the first object.

Steps (A) through (F) may be performed on first and second objects, wherein steps (A) and (B) are initially performed on the second object substantially concurrently with performing steps (D) and (E) a first time on the first object.

The switches may include interconnect conveyors, wherein the method further comprises the step of controlling speeds of the interconnect conveyors to avoid object collisions in the switches. The method may further include the step of controlling gaps in trains of objects to avoid object collisions in the switches.

The method may include the step of controlling at least one accumulation conveyor entering a switch to avoid object collisions in the switch. In that case, the accumulation conveyor may be controlled to prevent a first object from entering a collision envelope of a second object.

The method may further include the step of repeating steps (C) through (E) at least one additional time, whereby path redundancy is provided. The step of transferring the object may be performed by a routing conveyor, Another embodiment of the invention is an object sorter having N sorter input conveyors that are each selectably connectable through the sorter to each one of N sorter output conveyors, the sorter including $\log_2(N)$ switch banks, each bank comprising N/2 crossover diverts, each crossover divert receiving a pair of rows, one row of the pair having a binary representation with a parity opposite that of a binary representation of the other row of the pair, each crossover divert having a straight position that does not change the row of an object, and a cross position that switches the object to the other of the pair of rows received by the crossover divert, a first of the $\log_2(N)$ switch banks being arranged for receiving the N sorter inputs, a last of the $\log_2(N)$ switch banks being arranged to discharge to the N sorter outputs. The sorter further comprises at least $\log_2(N)$-1 perfect shufflers, each perfect shuffler placed between a pair of switch banks, each perfect shuffler being for receiving N inputs and rerouting each input from a current row to a shuffled row having a binary representation that is a rotation of a binary representation of the current row.

Yet another embodiment of the invention is a package sorter, comprising a network of conveyors and crossover diverts interconnected in a topology of an omega network having N inputs and N outputs; and a controller connected to at least the crossover diverts to selectably route an object through the network from a selected input to a selected output.

The controller of that package sorter may be configured to admit a package through a crossover divert before a package having previously passed through the crossover divert exits the sorter. The controller may be configured to control speeds of the conveyors to avoid object collisions in the crossover diverts.

The controller may be further configured to control gaps in trains of packages to avoid object collisions in the crossover diverts. The controller may be configured to control at least one accumulation conveyor entering a crossover divert to avoid object collisions in the crossover diverts. That accumulation conveyor may be controlled to prevent a first package from entering a collision envelope of a second package.

The network of conveyors and crossover diverts may be interconnected in a topology of an omega network that contains more than $\log_2(N)$ banks of crossover diverters, whereby path redundancy is provided.

The crossover diverters may be diverters selected from a group consisting of pop-up wheels, flippers, lateral pushers and flexible conveyor spines.

The package sorter may further include at least one package identifier at the network inputs. The package sorter may further include an array of sensors placed before the crossover diverters and connected to the controller for controlling crossover diverter timing. The sorter may include a vision system connected to the controller for providing information on package location.

BRIEF DESCRIPTION OF THE DRAWINGS

FIGS. 3a-3c are schematic diagrams showing crossover diverters according to one embodiment the invention.

DESCRIPTION OF THE INVENTION

The present invention is a carton or package sorter or pre-sorter, for sorting or pre-sorting objects in, for example, a distribution center. The terms "object," "parcel," "carton" and "package" are used herein interchangeably to describe physical objects that may be sorted using the invention. As used in this specification, those terms mean any physical object that may be transferred on a conveyor and diverted from conveyor to conveyor using mechanical diverters as described herein.

The sorter has a number of advantages over existing sorters, such as high rates at low conveyance speed. In turn, this translates into low-cost diverts, weak real-time requirements, low noise, path redundancy (which affords both fault-tolerance and load-balancing), reduction of subparts by combination of functions, adaptability to legacy distribution centers (DCs), and modular rate scalability. The sorter of the invention is able to realize a conveyance path from an arbitrary input to an arbitrary output; thus, objects presented at any input can be routed (i.e., sorted to) to any output.

Figure 1:
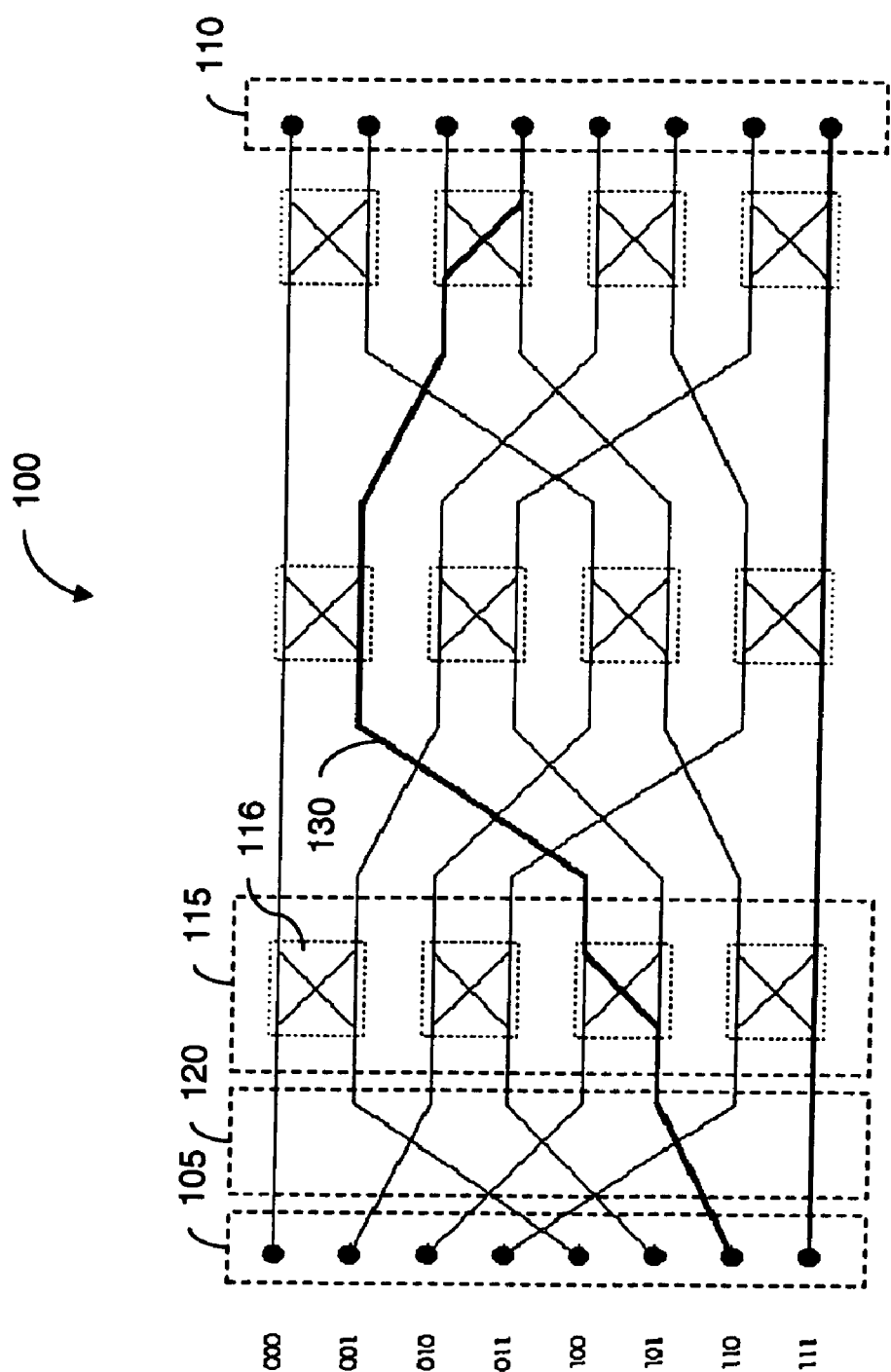
FIG. 1 is a schematic diagram showing a prior art omega network.

The sorter of the invention is a collection of conveyors (standard and accumulation) and crossover diverts (also called "switches"), interconnected according to the topology of a shuffle-exchange or "omega" network. For a more thorough treatment of omega sorters, see C. Kruskal, M. Snir, "A Unified Theory of Interconnection Network Structure", 48 Theoretical Computer Science 75-94 (1986). An example of such a network 100 is shown in FIG. 1. In the exemplary network, N=8, where N is the number of inputs 105 and also the number of outputs 110. The network 100 contains $\log_2(N)=3$ stages such as stage 115, each containing exactly N/2=4 crossover switches such as crossover switch 116. Consecutive stages are interconnected in a pattern 120 known as the perfect shuffle. If inputs of a perfect shuffle are numbered from top to bottom as 0, 1, . . . N-1, the perfect shuffle connects a given row i to a new row j which is the rotation of i as a bit string. This is known also as a circular shift. Without loss of generality, we assume these are "left" circular shifts. For example, row 010 gets mapped to 100, row 110 gets mapped to 101, etc.

A crossover switch such as switch 116 can be in one of two states: straight (S) or cross (C), corresponding to straight or crossed-over interconnections. By following the network path, a switch in the S state does not alter the row's parity (its lowest order bit); when in the C state, is changes the parity (i.e., inverts the lowest order bit).

It is therefore now possible to see that $\log_2(N)$ perfect shuffles or circular rotations (such as shuffle 120) interleaved with the same number of optional exchanges (such as stage 115) is sufficient to convert any binary number to any other; i.e., the network can synthesize an arbitrary path from any input to any output. In the 8-input, 8-output network 100 shown in FIG. 1, the highlighted path 130 from input 6 (binary 110) to output 3 (binary 011), is achieved through a shuffle-cross-shuffle-straight-shuffle-cross sequence.

At a minimum, an omega network such as network 100 requires $\log_2(N)$ times N/2 internal switches such as switch 116. In contrast, a complete interconnect (known as a crossbar network) requires $N^2$ switches. One disadvantage of the former network over the latter is that it is a blocking network: when two inputs that share a switch must connect to distinct outputs, one of the connections is impossible, and is therefore "blocked." Though non-blocking behavior is essential for contiguous electrical paths (where crossbar switches originate), it is not so for streams of parcels containing gaps between parcels.

Figure 2:
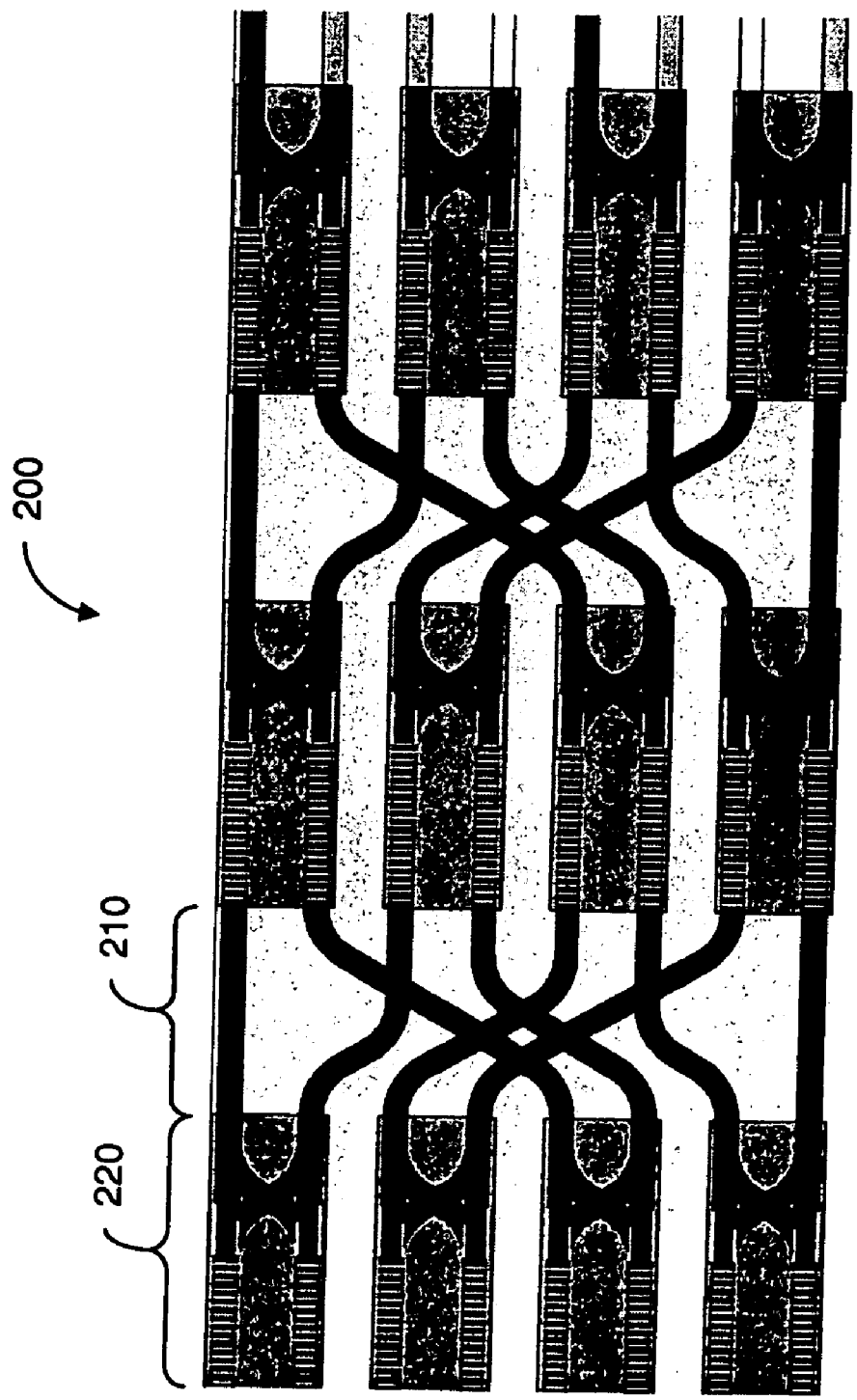
FIG. 2 is a schematic diagram showing a package sorter according to one embodiment the invention.

A package sorter 200 according to one embodiment of the invention is shown in FIG. 2. While the sorter 200 of the present invention utilizes the topology of the omega network, the connections in the sorter are made by conveyors such as those in the perfect shuffler 210, and the crossover switches are dual divert & merge devices (also called switches here) such as those in the switch bank 220. The initial perfect shuffler 120 of FIG. 1 is shown "straightened out" in FIG. 2 because it is both simpler and because the shuffled labeling of inputs 220 of the sorter of FIG. 2 is a control software issue.

Unlike the interconnection network 100 of FIG. 1, where a contiguous path 130 is established between input i and output j, the sorter of the present invention switches objects piecemeal. That renders end-to-end blocking a per-package issue; i.e., blocking is temporary, and is done to avoid package collisions at the merge points. The blocking function is performed by the system flow control, as described below.

Unlike linear sorters which require an increase in speed to increase rate, the sorter of the present invention is a scalable architecture that gives a fixed increment in rate per input (and required internal interconnections) added to the system (a conservative estimate is 60 cpm/input at 1 m/s), similar to the induct parallelism of circular sorters. All product motion in the inventive sorter is forward (except at the diverts) so centrifugal forces are kept low. Increasing speed for the inventive sorter will also increase its rate, but a recommended practice is to achieve high rate through a high number of inputs/outputs, while all conveyance is kept at a low speed, and equipment is kept at a low cost.

Unlike circular sorters, the induct to the sorter of the present invention requires no special control, since the system operates as a flow-forward, continuous sortation machine. At low speeds, fully parallel, lower-cost conveyors and diverts can be used, reducing noise and increasing safety around the device. Low-speed operation imposes few or no real-time requirements on the controller, reducing costs and increasing robustness.

Switch Design

The conveyor-based crossover switch or diverter used in the sorter of the present invention, an example of which is shown in FIG. 3a, has two inputs (top 310 and bottom 315) and two outputs (top 320 and bottom 325). It must allow product to flow from the top input 310 to either the top exit 320 (straight flow) or bottom exit 325 (diverted flow). One embodiment includes a switch with on-level crossovers 328, 329 and pop-up wheel diverters 327, shown in FIG. 3a. In another embodiment shown in FIG. 3b, a switch is provided with off-level crossovers 338, 339. FIG. 3c shows an embodiment including a switch with adjacent conveyors and lateral pushers (not shown) for exchanging packages in a crossover zone 340. A particular divert technology is selected depending on cost, volume utilization, and rate issues. Additional designs include flippers and a flexible conveyor spine (not shown).

Unlike the dual-state switches in the omega network shown in FIG. 1, in the sorter of the present invention, top and bottom divert states are independent, so the switch can be in one of four states: (straight, straight), (straight, divert), (divert, straight), (divert, divert).

Controller

Figure 4:
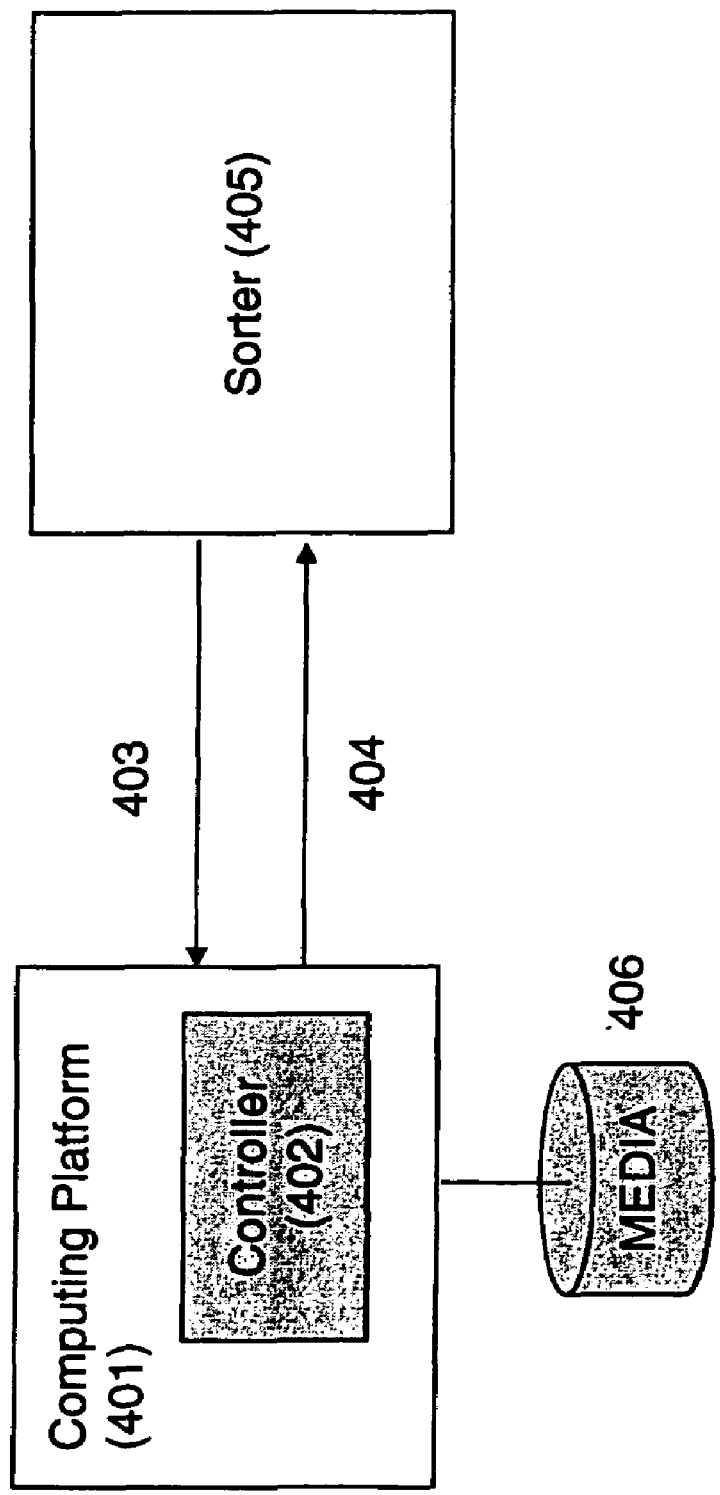
FIG. 4 is a schematic diagram showing a control system according to one embodiment the invention.

An embodiment of the interface between a computing system 401 and the inventive sorter 405 is shown in FIG. 4.

The computing system 401 executes a controller program 402 as its sole process or along with other threads and/or processes in a multi-tasking operating system. The controller program 402 may be stored on a computer readable medium 406 such as volatile or non-volatile memory, magnetic or optical media or other storage media for retrieval and execution by the computing system 401.

The computer 401 receives from the sorter 405 a stream of sensor information in a high-speed input data bus 403. This data includes package positions (e.g., as obtained from laser sensors, vision, and others), switch positions, conveyor speeds, etc. In turn, and as determined by the controller program 402, the computing platform 401 sends actuation signals to the inventive sorter 405 via a high-speed output data bus 404, including exchange switch positions, speeds for all conveyor belts, general speeds, emergency stops, etc.

Routing

Let switch columns be numbered left to right from 0 to $\log_2(N)-1$. Because the perfect shuffle interconnect executes a left rotation of row number, and a divert inverts the parity (lower-order bit), a package being routed through the sorter is diverted at a switch in stage K if the K-th most significant bit in the input address is different from the K-th bit of the destination address. Conversely, a package is let straight at a switch in stage K if the K-th most significant bit in the input address is equal to the K-th bit of the destination address. Programmatically, for a an N-input sorter:

$$\text{divert[stage]}=(2^{**}(N-1)>>\text{stage})\&(\text{input} \wedge \text{output})=0$$

where** indicates an exponent, >> represents a bitwise rotate right, & indicates bitwise, and ^ represents bitwise x or operations. When the network is redundant, the method is slightly modified; specifically, it is only used for the last $\log_2(N)$ stages of the redundant network (see below).

Flow Control

Flow control ensures that as parcels are diverted, they do not collide at the two merge points of a switch and that there is never too much accumulation and back up prior to a switch (overflows). In one approach, flow control is achieved through continuous speed control at the interconnect conveyors. In another approach, parcel trains are gapped over a sequence of conveyors.

In yet another approach, two accumulation conveyors precede a switch and can assume either a "flow" state or an "accumulate" state. In the "flow" state, product is conveyed normally. In the "accumulate" state, product arriving at the end of the conveyor stops, and other product coming behind queues up. The flow control algorithm sets the appropriate state of the accumulation conveyors so as to avoid collisions and maintain a balanced flow. In particular, a maximum length of the two input queues is always kept at a minimum.

Figure 5A:
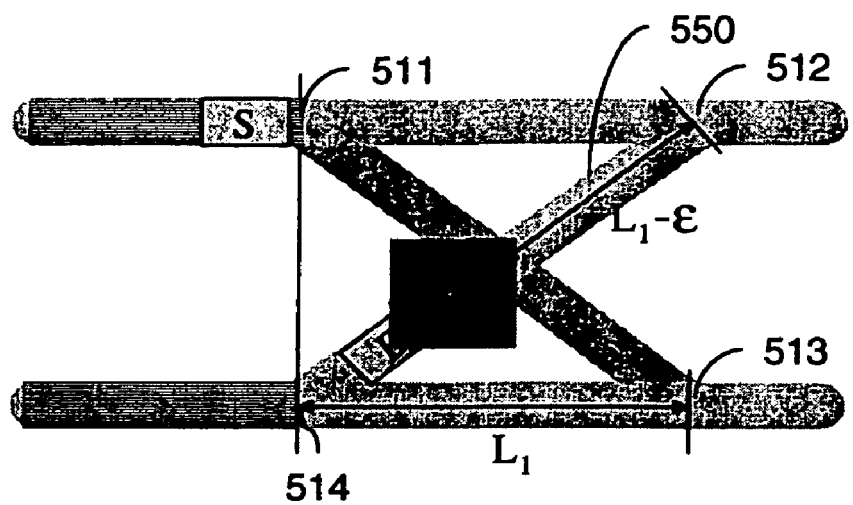
FIGS. 5a-5c are schematic diagrams showing crossover diverters according to one embodiment the invention.
Figure 5B:
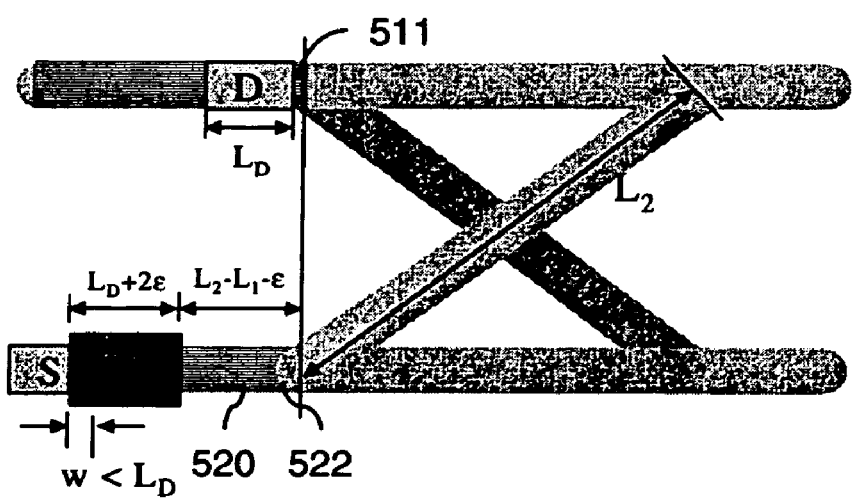
Figure 5C:
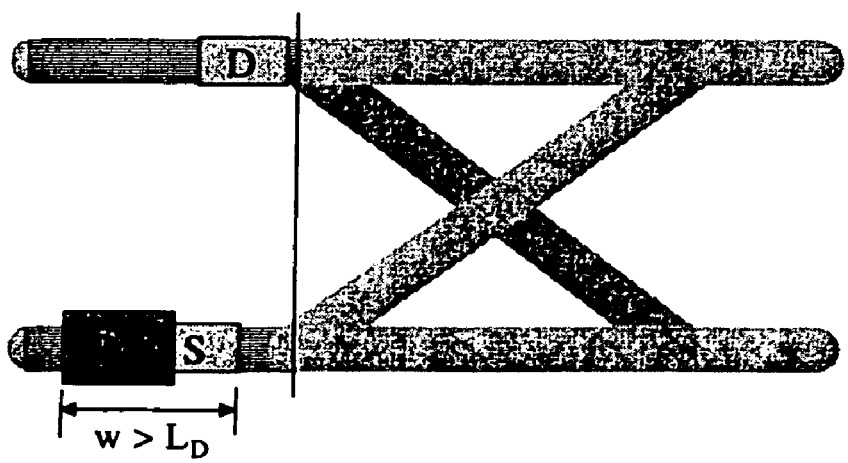

An accumulation-based approach to collision avoidance is illustrated in FIGS. 5a, 5b and 5c. $L_1$ is the length of conveyor path from immediately after the top divert 511 to the top output 512 (or from bottom divert 514 to bottom output 513). $L_2$ is the length from the top divert 511 to the bottom output 513 (or from bottom divert 514 to top output 512). Because the route followed by $L_2$ requires a change in paths, $L_2$ is typically longer than $L_1$.

As shown in FIG. 5a, a parcel S to be delivered straight to the top output 512 will collide at the merge point with a parcel D currently midway through its divert route, and should therefore not be released. That is the case because S's collision envelope S* overlaps a parcel D on the divert route. S* is located $L_2-L_1$ units upstream from merge point. ε is a collision-avoidance spacing parameter.

FIG. 5b shows a symmetric situation. A parcel D that is about to be diverted at the top input 511 will collide with a parcel S on the bottom accumulation conveyor 520 unless the parcel D is stopped. That is the case because D's collision envelope D* ($L_2$-$L_1$ distance to the right of the bottom input 522) overlaps S.

FIG. 5c shows a situation similar to FIG. 5b except that most of parcel S in FIG. 5b is to the left of D* and in FIG. 5c, most of parcel S is to the right of D*. It can be seen that in the situation depicted in FIG. 5b it is more efficient to release D and block S when it reaches the input for a short period of time. In contrast, in the situation depicted in FIG. 5c it is more efficient to block D until the moving S clears D*.

Another approach is to block parcel D for the time it will take for any straight parcel on the bottom conveyor to be released (computed as their average length divided by the conveyance speed). Yet another approach is to use the length of the longest parcel in computing D's blocking time.

Figure 6:
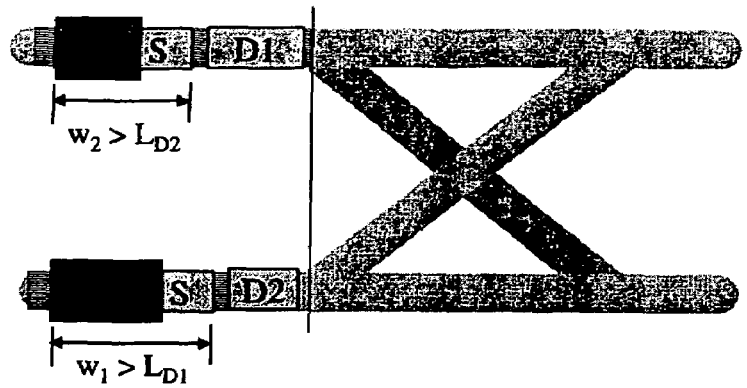
FIG. 6 is a schematic diagram showing a crossover diverter according to one embodiment the invention.

A deadlock situation is illustrated in FIG. 6. In that scenario, two situations as in FIG. 5b conspire to cause the simple scheme above to withhold both parcels D1 and D2 (the one on the top and the one on the bottom), causing flow through the switch to halt. To avoid this scenario, a higher-level supervisory control decides to release the parcel D that is at the head of the longest queue (delaying or avoiding an overflow).

In general, flow control can take into account a collection of decisions, extrapolating them into the future, to select the set of decisions that maintains the minimum maximum queue length. Planning/scheduling techniques requiring generate-simulate-and-test-based searching can be employed here, and the maximum number of future scenarios looked at will be limited by the amount of processing time available per cycle to the controller.

Another aspect of flow control is dealing with overflows. If queue lengths approach the end of the accumulation buffer, product flow must be slowed down upstream, and that action is propagated back through the network until the overflow is cleared.

Fortunately, when $L_2 > L_1$, the controller can focus on possible blocking times for any "eligible" D; i.e., a parcel D that is at the extreme right of its accumulation conveyor, just prior to the input. That is because blocking or releasing a straight parcel is dependent solely on what can be seen ahead, namely, the situation in FIG. 5a, whereas an optimal blocking decision for an eligible D needs to take into account future history.

Figure 7:
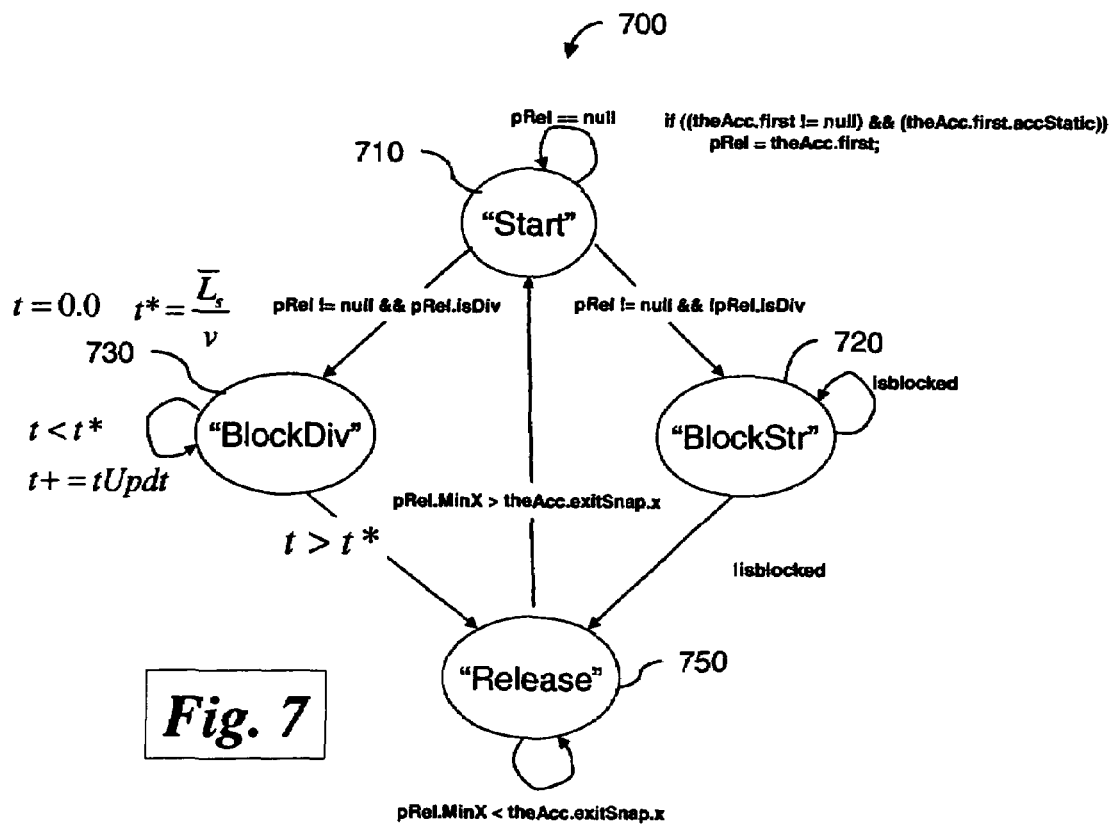
FIG. 7 is a schematic diagram showing a software state machine according to one embodiment the invention.

FIG. 7 is a schematic diagram showing one possible state-machine-based representation of a flow control algorithm. Each crossover switch maintains two such state machines, one for the top and one for the bottom input. The machine 700 shown is associated with a top conveyor.

The "start" state 710 waits for an "eligible" parcel to show up prior to the top divert (such parcels are called "eligible"). If the eligible is a straight (S) parcel, the right branch is descended, onto the "BlockStr" state 720. That state waits for an opening to appear on the bottom-to-top cross conveyor 550 (FIG. 5a), at which point the state switches to "Release" 750, which in turn waits for S to be completely past the divert area.

At that point the machine goes back to the "Start" state 710. If at "Start" the eligible parcel is a divert (D), the machine descends onto the "BlockDiv" state 730 and waits an amount of time prior to releasing D (done at state "RelDiv"). Once the D is past the divert area, the machine reverts to "Start" 710, reinitiating the process. The amount of time waited at BlockDiv can be based on a direct evaluation of S flow on the opposite conveyor (e.g., the average length of the parcels) or a scheduling/search-based planning expansion into the future. In any case, the waiting time for each eligible divert determines the performance of the system, in terms of keeping both queue lengths minimized.

Anti-deadlock control is performed by looking at the two state machines in a switch and forcing a release if both machines are currently blocking a divert (D) parcel. Note that due to the continuous flow at the divert areas, two straight (S) parcels cannot generate a deadlock.

Overflow control provides timely stoppage of conveyors upstream from an accumulation conveyor about to overflow due to queue length. In one embodiment of the invention, the overflow control operates as follows: if (a) a given accumulation conveyor's queue length approaches a high percentage (e.g. 75%) of its total length, an "overflow flag" is raised, and then (b) the two accumulation conveyors upstream from (a) are signaled to stop at a blocking state until that overflow flag is cleared. Then (c) the connecting conveyors upstream from (a) are signaled to stop after the last parcel crossing over to (a) is completely in (a). Then (b) and (c) wait in a blocking state until (a) can reduce the size of its queue to, for example, 50% of maximum length.

Sensing Infrastructure

Product destinations are preferably known as they enter the sorter of the invention. In one embodiment, each input line contains an independent identification means (e.g., barcode scanner, RFID antenna & reader, etc). In another embodiment, parcels are merged into a single, high-rate singulated line, scanned by a single device, and are then dispersed to separate input lines.

Because precise divert timing is required at every switch, an array of photo eyes (and possibly extra scanners) must precede the divert points. A central controller must keep track of parcel ordering and must be robust with respect to errors, order changes, etc.

Vision can also be employed to determine parcel location, increase tracking robustness and perform overall count, while also indicating if there are malfunctioning parts of the system. Extra barcode or RFID sensors may be distributed throughout the system to allow for recovery due to order inconsistency.

Scalability & Redundancy

Figure 8:
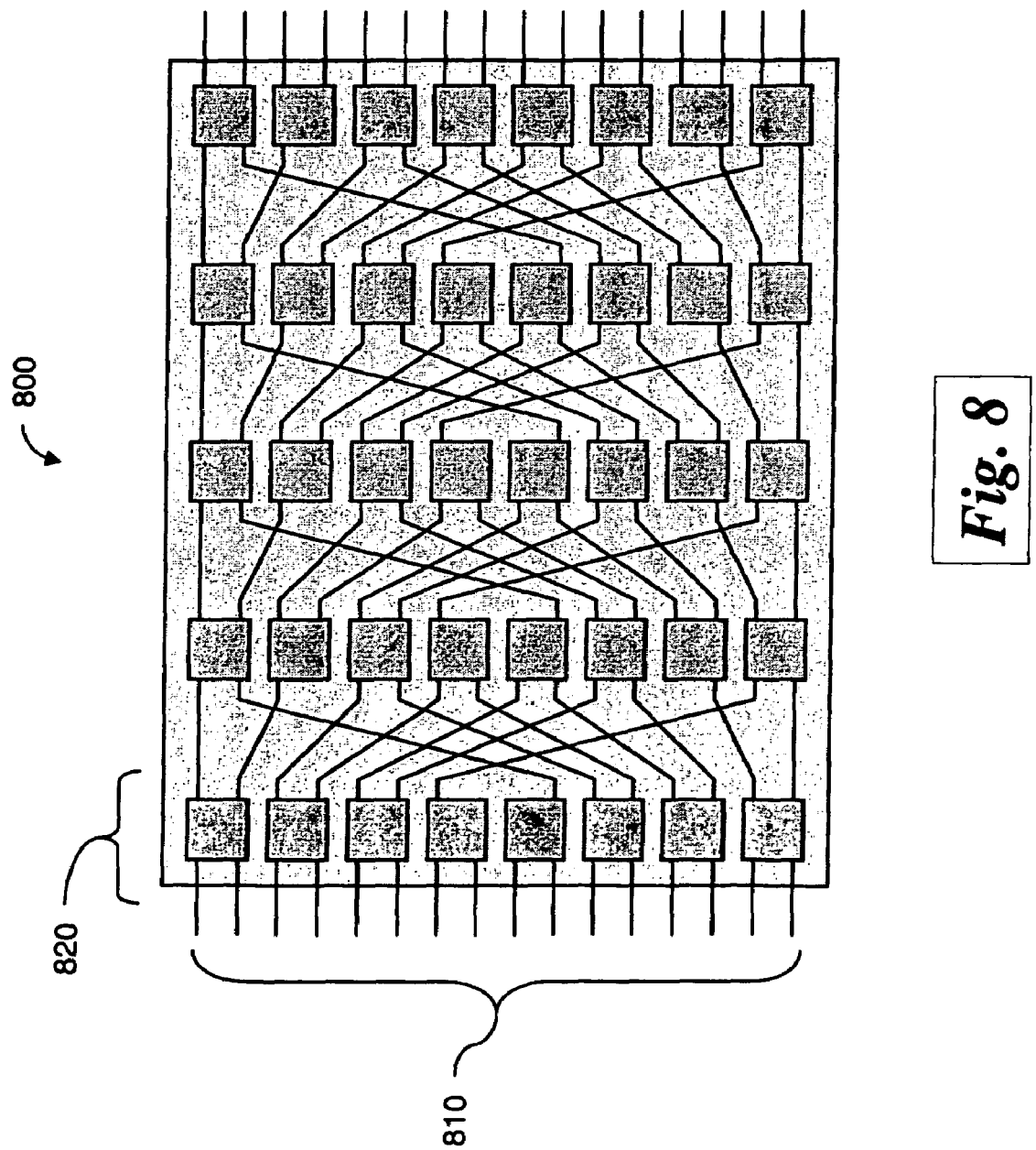
FIG. 8 is a schematic diagram showing a package sorter according to one embodiment the invention.

As demonstrated by the network 800 shown in FIG. 8, the shuffle-exchange concept can be grown to a larger number of inputs 810 (16 are shown), increasing the rate and sorter capacity with every input. Extra switching stages such as stage 820 provide path redundancy; i.e., multiple paths per input-output pair. Redundancy allows for both dynamic load-balancing and fault tolerance operation, because product can be routed around defective or overflown switches or interconnection conveyors. In general, $\log_2(N*R)$ stages are needed, where R is the number of paths per input-output pair required. In the network 800, R=2, so 5 stages are needed.

Routing with path-redundant networks is done as follows: the first $\log_2(R)$ stages are considered "redundant," so for those stages, divert decisions are independent of destination address; rather, those decisions are based on avoidance of downstream malfunctions or congestions (for load balancing). The first such $\log_2(R)$ diverts are then followed by a unique set of $\log_2(N)$ that routes the parcel to its proper destination.

Another approach to scaling up input number (while introducing redundancy) is the modular combination 900 of smaller omega-network-based sorters such as sorters 901-

Figure 9:
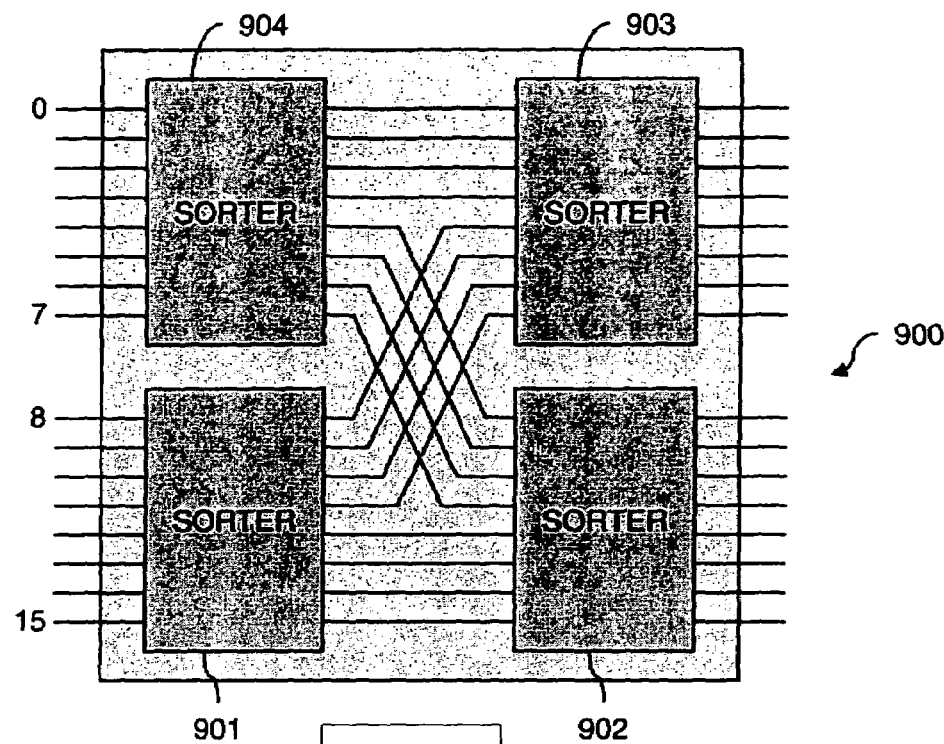
FIG. 9 is a schematic diagram showing a package sorter according to one embodiment the invention.

904, as shown in FIG. 9. A 16-input sorter (4-path redundancy is shown) is constructed from the four 8-input omega-network-based sorters, interconnected in a simple way. The design has the advantage of a smaller set of overlapping conveyors, but it has the disadvantage of less distributed fault-tolerance (the perfect shuffle is the optimal flow randomizer).

Figure 10:
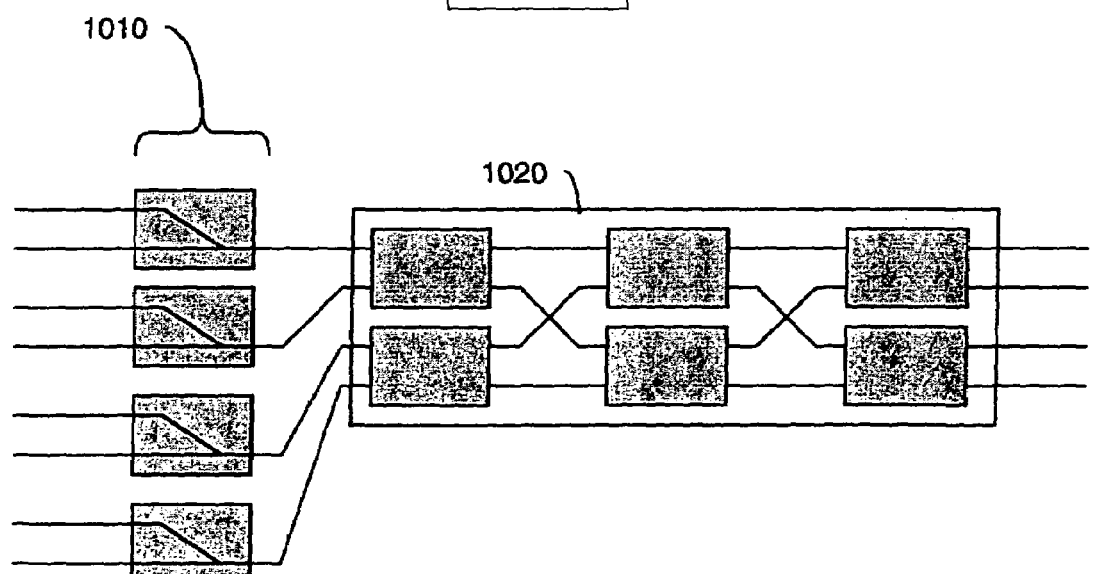
FIG. 10 is a schematic diagram showing a package sorter according to one embodiment the invention.

Some applications require a sorter with more inputs than outputs. The sorter of FIG. 10 achieves that by concatenating a stage of "merge only" switches 1010 to a smaller omega-network-based sorter 1020 (in this case carrying a 2-path redundancy).

Integration with Distribution Center

Figure 11:
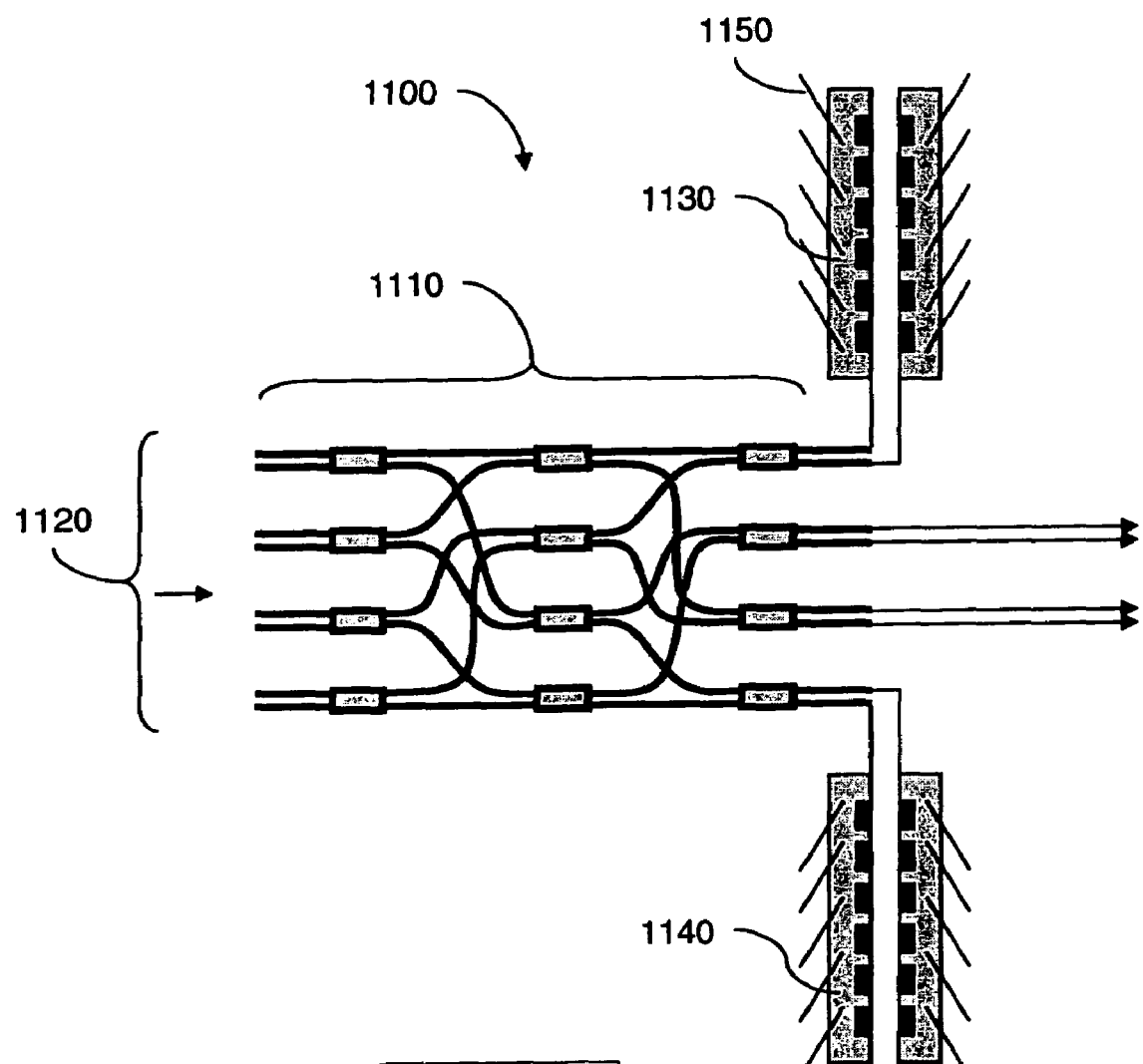
FIG. 11 is a schematic diagram showing a package sorter according to one embodiment the invention.

A key advantage of the sorter of the invention is how it can be grafted onto a legacy distribution center design; specifically, it can be made to replace much of the post-induct merge, presort, and pre-linear sort induct (gapping) modules. One possible arrangement is shown in FIG. 11. In that system 1100, the sorter 1110 acts as a high-rate, fault-tolerant pre-sorter. Inducted product is fed directly into its inputs 1120, and released directly into linear sorters 1130, 1140 for final delivery into specific chutes such as chute 1150.

Figure 12:
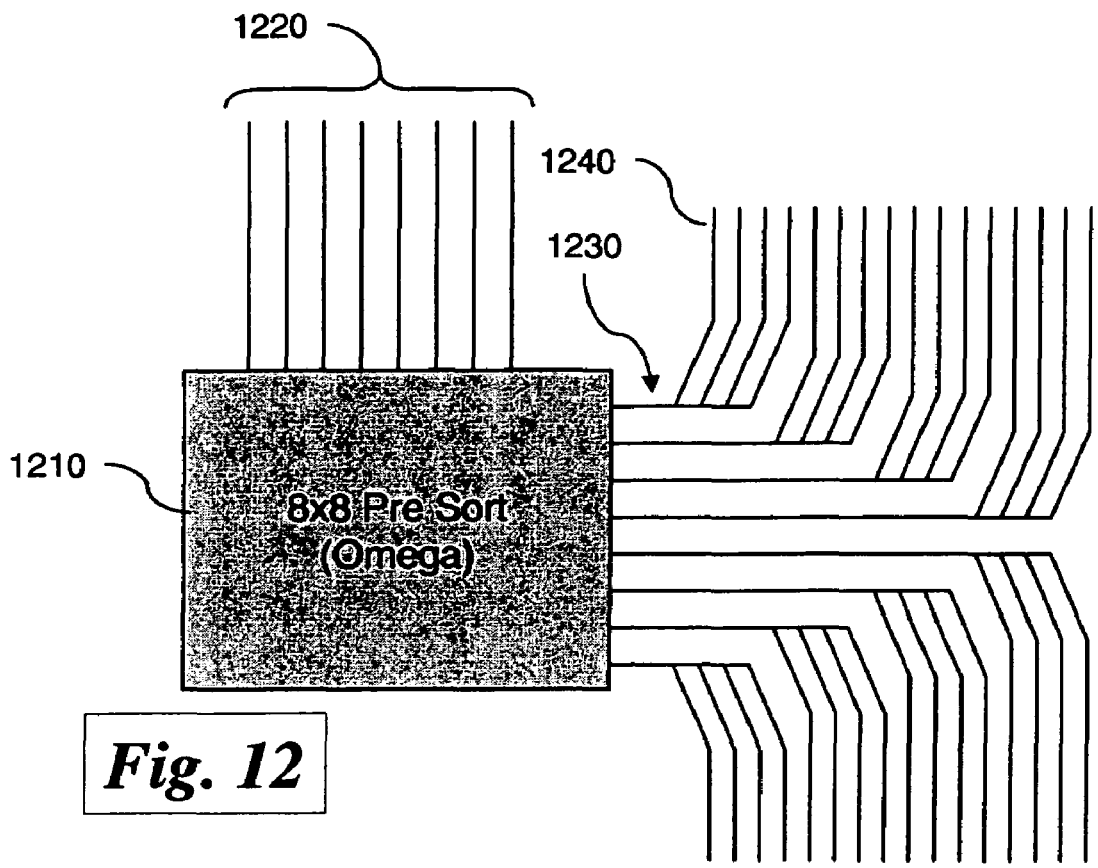
FIG. 12 is a schematic diagram showing a package sorter according to one embodiment the invention.
Figure 13:
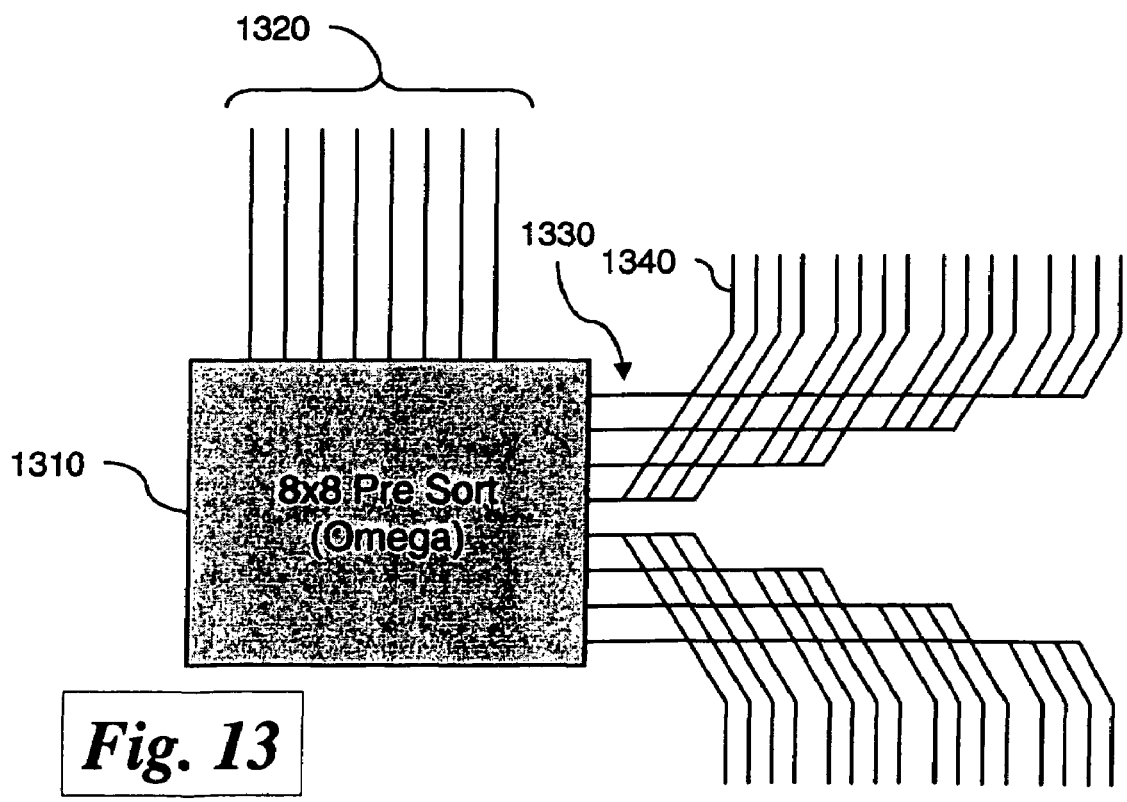
FIG. 13 is a schematic diagram showing a package sorter according to one embodiment the invention.

In FIGS. 12 and 13, the omega-network-based sorters are is shown as abstract module 1210, 1310 receiving inputs 1220, 1320 from pick modules or individual induct lanes, and producing outputs 1230, 1330 that branch out into individual "arteries" 1240, 1340, which then branch out into individual output chutes (not shown). The diverting technology for each artery may be based on lateral shoes, or, if cost effective (especially given the low conveyance speeds), a simple conveyor with divert actuators for each chute. FIG. 12 shows the basic concept, whereas FIG. 13 shows features that achieve a better equilibrium of total conveyance length from pre-sorter to destination.

Based on preliminary performance simulations done by the inventors, the sorter of the invention is suitable to replace or act as a presorter to both linear and circular sorters. For example, let 0.5 m be the average parcel-plus-gap length in a typical distribution center application. At 1 m/s conveyance speed, the average rate is 120 cpm/input. An 8-input sorter is therefore bounded by 8×120=960 cpm. Due to occasional stops or slowdowns caused by flow-control in the sorter (to avoid collisions at merge points), only a fraction of the maximum rate is achievable. Conservatively assuming 50% flow-control efficiency (FCE), such an 8-input sorter according to the invention is capable of handling 480 cpm; or in general, 60 cpm/input.

If 75% efficiency is achievable, an 8-input sorter according to the invention can output 720 cpm. A 16-input sorter at 50% FCE outputs 960 cpm, at 75%, it would output 1440 cpm.

Figure 14:
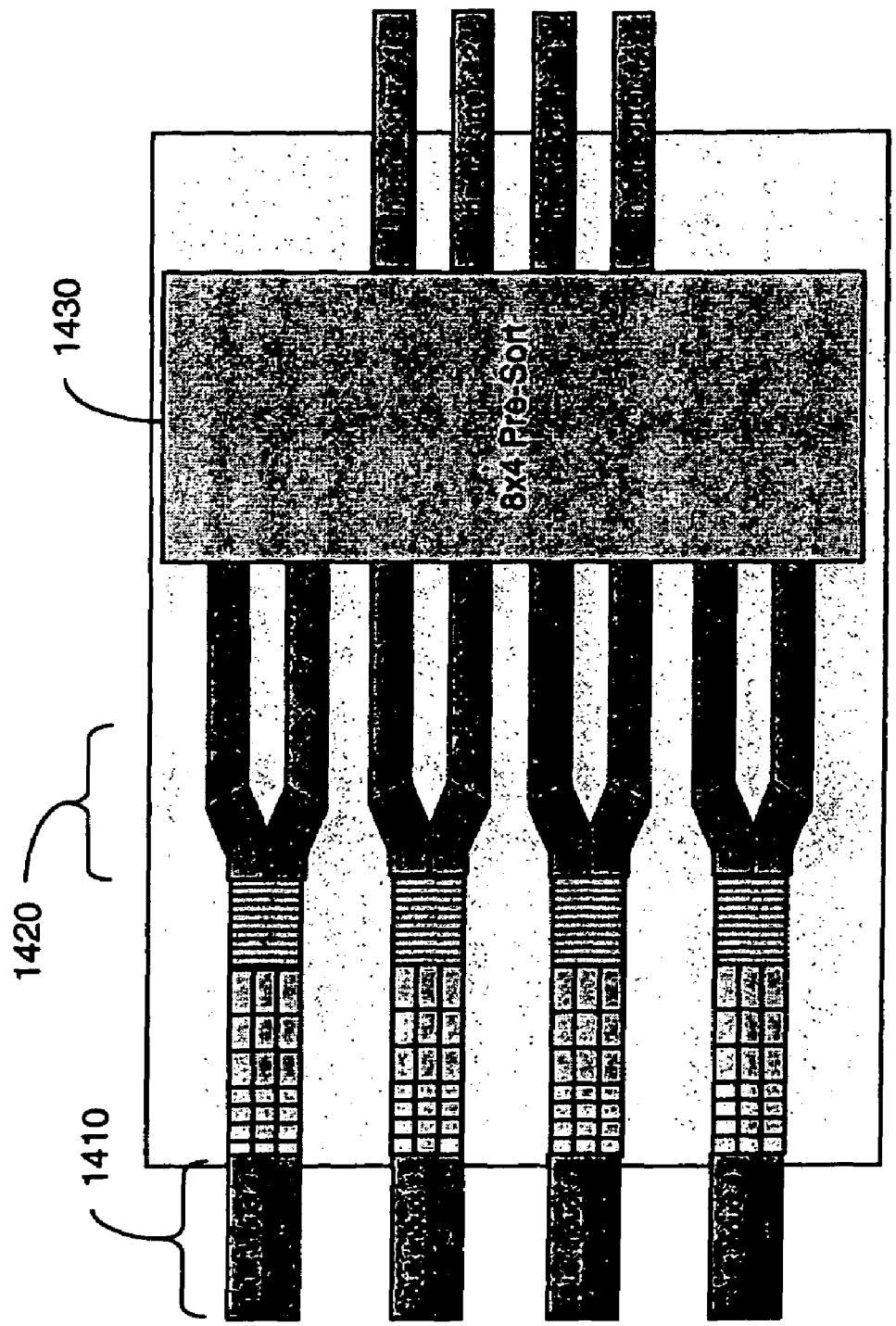
FIG. 14 is a schematic diagram showing a package sorter according to one embodiment the invention.

Another embodiment of the invention is shown in FIG. 14. Certain applications/markets require a "bulk induct." If a bulk induct 1410 is followed by a singulation stage 1420, the resulting singulated lines can be inducted straight into the sorter 1430.

The sorter design may be expanded into one dimension to admit more inputs, and into another dimension to create path redundancy, allowing for both fault-tolerance (product can be routed around defective subcomponents) and load-balancing (imbalanced product mixes can be adaptively distributed over unused conveyor surface) features.

Summary

In sum, the sorting apparatus and method of the invention provides distributed sortation, wherein all parts of the system move at low speed (e.g., 1 m/s), working in parallel to achieve sortation. The apparatus and method also provide distributed routing, wherein intelligence can be built at each divert point because only local information about the parcels' identification is required.

The present invention has only weak requirements on sensing and control. If parcel identification is known at the induct, and ordering is preserved, the system requires only binary type "photo eye" sensors. Because conveyance speed is low, control systems need not be hard real-time.

The invention provides an integrated solution. Ancillary and expensive, space-occupying functions such as merge and presort can be removed from legacy systems. The inventive sorter is fault-tolerant because product can be routed around a malfunctioning or overloaded area The sorter is capable of load balancing, wherein severe backups occurring in linear sorters due to a skewed product mix at the induct can be handled by distributing the surge over multiple paths.

The sorter of the invention is scalable and configurable. The sorter's basic structure can be grown modularly to accommodate for more inputs, more outputs, more path redundancy, different rates, and different speeds. It is further amenable to vertical three-dimensional packing. If floor space is an issue, switches and conveyors can be made to better utilize the vertical dimension, e.g., by positioning certain modules over others and thus saving horizontal space.

The complexity of a distribution center is reduced through the use of a sorter as described above, because product is inducted straight into the sorter's flow-through architecture, and flows out straight into the delivery conveyors. There is no need for complex induct subsystems such as gapping units, merge units, pre-sorters, etc.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the technique is described primarily for use in connection with parcels in a distribution center, those skilled in the art will understand that the technique may be used as well in connection with the sortation of any other physical object, such as parts in a manufacturing facility or produce in an agricultural processing plant, or letters in a mail distribution center. It is to be understood that the embodiments shown and described herein are only illustrative of the principles of the present invention and that various modifications may be implemented by those skilled in the art without departing from the scope and spirit of the invention.

What is claimed is:

1. A method for sorting an object in a sorter having N rows, the object entering the sorter in a current row, the method comprising the steps of:

(A) setting a first crossover switch to one of a straight position that does not change the current row of the object, and a cross position that switches the object to a row having a binary representation with a parity opposite that of a binary representation of the current row;

(B) passing the object through the crossover switch to a new current row;

(C) transferring the object from the current row to a new current row having a binary representation that is a circular rotation of a binary representation of the current row;

(D) setting a next crossover switch to one of a straight position that does not change the current row of the object, and a cross position that switches the object to a row having a binary representation with a parity opposite that of a binary representation of the current row;

(E) passing the object through the crossover switch to a new current row; and (F) repeating steps (C) through (E) a total of $\log_2(N)$-1 times.

2. The method of claim 1, wherein steps (A) through (F) are performed on first and second objects, and wherein steps (A) and (B) are initially performed on the second object before repeating steps (E) through (F) a total of $\log_2(N)$-1 times on the first object.

3. The method of claim 1, wherein steps (A) through (F) are performed on first and second objects, and wherein steps (A) and (B) are initially performed on the second object substantially concurrently with performing steps (D) and (E) a first time on the first object.

4. The method of claim 1, wherein the switches include interconnect conveyors, and wherein the method further comprises the step of:
controlling speeds of the interconnect conveyors to avoid object collisions in the switches.

5. The method of claim 1, further comprising the step of:
controlling gaps in trains of objects to avoid object collisions in the switches.

6. The method of claim 1, further comprising the step of:
controlling at least one accumulation conveyor entering a switch to avoid object collisions in the switch.

7. The method of claim 6, wherein the accumulation conveyor is controlled to prevent a first object from entering a collision envelope of a second object.

8. The method of claim 1, further comprising the step of:
repeating steps (C) through (B) at least one additional time, whereby path redundancy is provided.

9. The method of claim 1 wherein the transferring step is performed by a routing conveyor.

10. An object sorter having N sorter input conveyors that are each selectably connectable through the sorter to each one of N sorter output conveyors, the sorter comprising:
$\log_2(N)$ switch banks, each bank comprising N/2 crossover diverts, each crossover divert receiving a pair of rows, one row of the pair having a binary representation with a parity opposite that of a binary representation of the other row of the pair, each crossover divert having a straight position that does not change the row of an object, and a cross position that switches the object to the other of the pair of rows received by the crossover divert, a first of the $\log_2(N)$ switch banks being arranged for receiving the N sorter inputs, a last of the $\log_2(N)$ switch banks being arranged to discharge to the N sorter outputs; and at least $\log_2(N)$-1 perfect shufflers, each said perfect shuffler placed between a pair of said switch banks, each said perfect shuffler for receiving N inputs and rerouting each input from a current row to a shuffled row having a binary representation that is a rotation of a binary representation of the current row.

11. A package sorter, comprising:
a network of conveyors and crossover diverts interconnected in a topology having:
N inputs and N outputs;
at least $\log_2(N)$ switch banks, each bank comprising N/2 crossover diverts, each crossover divert having a pair of entry conveyors and a pair of exit conveyors and being capable of selectively conveying a package from either entr conveyor to either exit conveyor; and
at least $\log_2(N)$-1 perfect shufflers, each said perfect shuffler wing connected between a pair of switch banks and having N entry conveyors, each perfect shuffler rerouting each entry conveyor to an exit conveyor having a binary representation that is a rotation of a binary representation of the rerouted entry conveyor; and
a controller connected to the crossover diverts to selectably route an object through the network from a selected input to a selected output.

12. The package sorter of claim 11, wherein the controller is configured to admit a package through a crossover dived before a package having previously passed through the crossover divert exits the sorter.

13. The package sorter of claim 11, wherein the controller is further configured to control speeds of the conveyors to avoid object collisions in the crossover diverts.

14. The package sorter of claim 11, wherein the controller is further configured to control gaps in trains of packages to avoid object collisions in the crossover diverts.

15. The package sorter of claim 11, wherein the controller is further configured to control at least one accumulation conveyor entering a crossover divert to avoid object collisions in the crossover diverts.

16. The package sorter of claim 15, wherein the accumulation conveyor is controlled to prevent a first package from entering a collision envelope of a second package.

17. The package sorter of claim 11, wherein the network of conveyors and crossover diverts contains more than $\log_2(N)$ banks of crossover diverters, whereby path redundancy is provided.

18. The package sorter of claim 11 wherein the crossover diverters are diverters selected from a group consisting of pop-up wheels, flippers, lateral pushers and flexible conveyor spines.

19. The package sorter of claim 11, further comprising at least one package identifier at the network inputs.

20. The package sorter of claim 11, further comprising an array of sensors placed before the crossover diverters and connected to the controller for controlling crossover diverter timing.

21. The package sorter of claim 11, further comprising a vision system connected to the controller for providing information on package location.

* * * * *